US006741614B1

(12) United States Patent
Porter et al.

(10) Patent No.: US 6,741,614 B1
(45) Date of Patent: May 25, 2004

(54) METHOD AND SYSTEM FOR COMPENSATING SIGNAL PROPAGATION DELAY

(75) Inventors: John David Porter, Great Shelford (GB); Walter Charles Vester, Philadelphia, PA (US)

(73) Assignee: Axxcelera Broadband Wireless, Santa Barbara, CA (US)

( * ) Notice: Subject to any disclaimer, the term of this patent is extended or adjusted under 35 U.S.C. 154(b) by 0 days.

(21) Appl. No.: 09/538,153

(22) Filed: Mar. 29, 2000

(30) Foreign Application Priority Data

Mar. 31, 1999 (GB) ............................................. 9907482

(51) Int. Cl.[7] .................................................. H04J 3/06
(52) U.S. Cl. ...................... 370/508; 370/332; 370/519; 370/517
(58) Field of Search ................. 370/276, 280, 370/283, 294, 329, 337, 347, 345.4, 437, 442, 458, 498, 508, 517, 519, 464, 332, 333, 336, 395, 468, 516

(56) References Cited

U.S. PATENT DOCUMENTS 5,745,484 A    4/1998  Scott
6,256,321 B1 *  7/2001  Kobayashi ................. 370/464

FOREIGN PATENT DOCUMENTS

| EP | 0 813 316 A1 | 12/1997 |
| GB | 2 095 516 A | 9/1982 |
| GB | 2 243 055 A | 10/1991 |
| GB | 2 277 232 A | 10/1994 |
| GB | 2 301 734 A | 12/1996 |
| WO | WO 95/02306 | 1/1995 |

OTHER PUBLICATIONS

Salim Manji, et al., *Reverse Link Power Control for Packetized DS–CDMA in a Slowly Rayleigh Fading Environment*, IEEE International Conference of Communications, Jun. 8, 1997, pp. 101–105.

Babul Miah, et al., *An Economic ATM Passive Optical Network*, IEEE Communications Magazine, Mar. 1997, pp. 62–68.

* cited by examiner

*Primary Examiner*—Phirin Sam
(74) *Attorney, Agent, or Firm*—Finnegan, Henderson, Farabow, Garrett & Dunner L.L.P.

(57) ABSTRACT

Propagation delay compensation in a wireless network comprising a central access point and multiple subscriber terminals is achieved by defining a registration time slot in which new subscriber terminals must first transmit network registration signals to the access point. The subscriber terminals by default transmit at the start of the time slot, and the access point times the delay from the start of the slot to the receipt of the subscriber terminal registration request, and then transmits this information back to the subscriber terminal. In all subsequent transmissions the subscriber terminal uses this information to delay its transmissions to compensate for differences in signal propagation delay between each subscriber terminal.

16 Claims, 7 Drawing Sheets

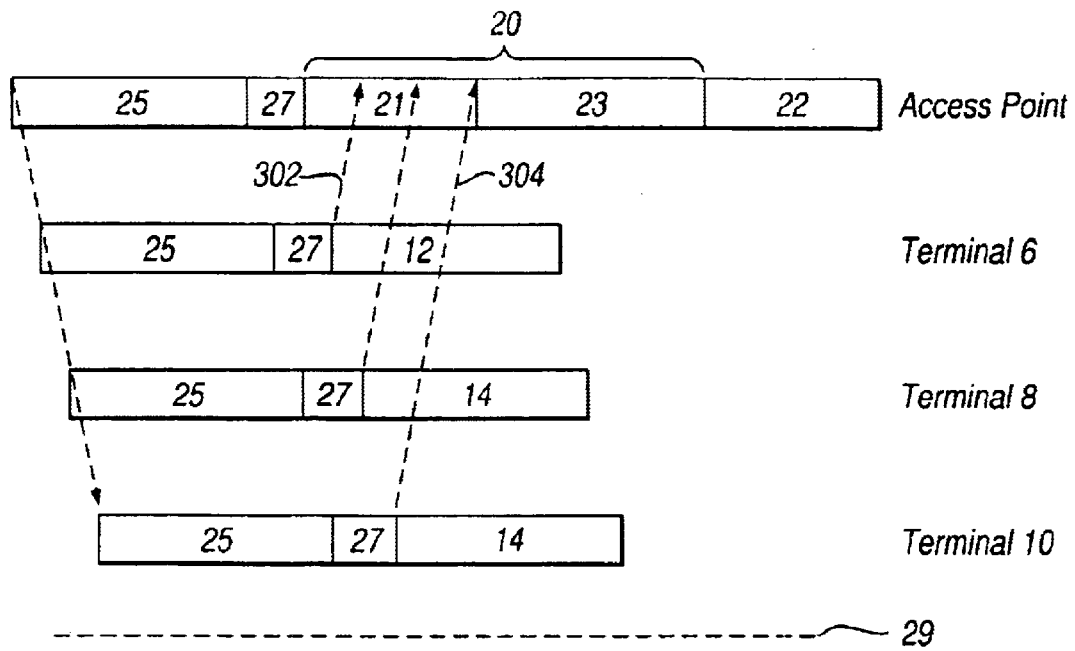
Fig.5  Time ⟶
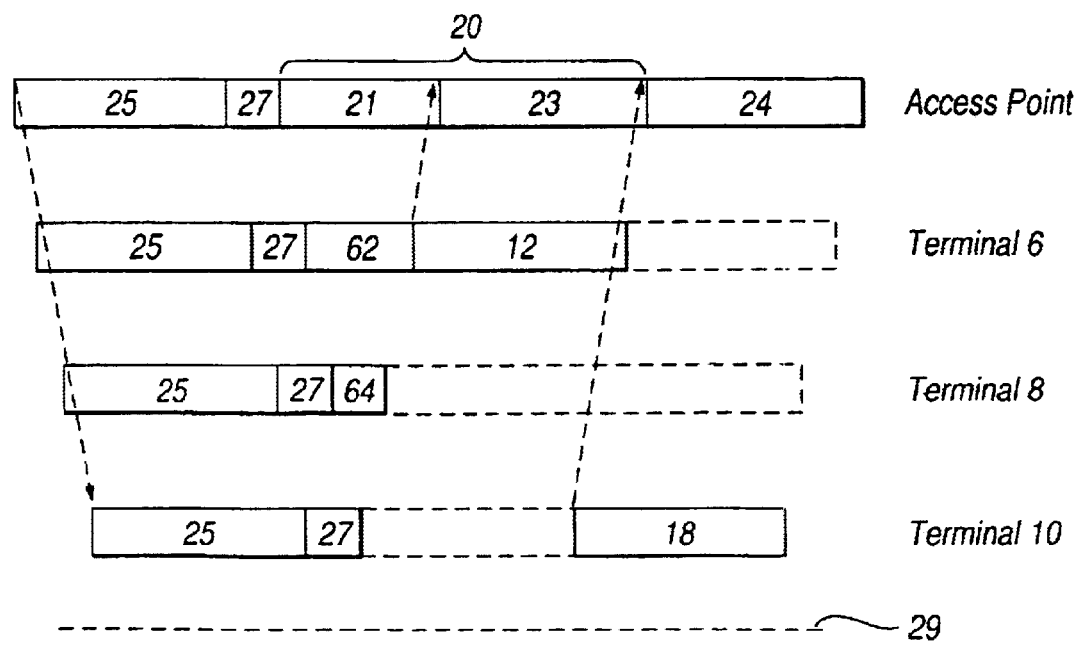
Fig.6  Time ⟶

TT   RF Turnaround Time

METHOD AND SYSTEM FOR COMPENSATING SIGNAL PROPAGATION DELAY

TECHNICAL FIELD

The present invention relates to a method and system for compensating for signal propagation delay between network nodes in a data communications network.

More particularly, the present invention relates to a method and system for compensating for signal propagation delay which can be integrated with a method or system for controlling network node transmit power levels, and which is of particular use in a data communications network where accurate power control and time synchronisation is required.

BACKGROUND OF THE INVENTION

Data networks can be classified in many ways, but for the purpose of the present invention, it is useful to classify them by their means of accessing the medium over which data is communicated. The relevant classifications are broadcast and non-broadcast.

An existing type of data network is Ethernet. Ethernet uses broadcast medium access. All network nodes sharing the network medium hear all traffic being passed over the medium. Traffic is directed to individual network nodes via physical layer addresses that are attached to the data packets being sent over the medium. When multiple network nodes attempt to transmit data simultaneously, there is the possibility for contention among the nodes for access to the medium.

A modification to the broadcast network is the broadcast network with hidden terminals. In this network, all terminals share the same medium, however it cannot be guaranteed that all terminals can hear each other. All that can be guaranteed is that all terminals can hear the central network node, referred to herein as the access point. For this reason, it is not enough for each terminal simply to monitor the channel in order to detect contentions. Feedback on success or failure of network contention must also be communicated back to the network terminals by the access point.

Point-to-point full duplex connections, in contrast to the above, do not require contention for the network medium. This is because only two network elements, at each end of the network medium, share access to the medium.

Point-to-multipoint networks in which several network nodes share access to a network medium can simulate point-to-point connections. In such a network a fixed time slot is assigned to each node of the network, and the transmissions of each node are restricted to its particular assigned time slot. An example of such an arrangement of the prior art would be a Time Division Multiple Access (TDMA) network. A cellular wireless network, in which there is a central access point and multiple subscriber terminals sharing access to the channel using TDMA medium access, is an example of such a network. In such networks, since the various subscriber terminals are separated from the central access point by an unknown distance, there is a bounded but unknown elapsed time of propagation as the signal passes between the subscriber terminal and the central access point. In this situation, a guard time equal to twice the maximum propagation time over the cell radius must separate each time slot, since the network has no knowledge from where in space each burst transmitted in a time slot will originate. The problem will be illustrated further with reference to FIGS. 1 and 2.

Within FIG. 1, a central access point 2 provides access to a wide area network (not shown) for a number of subscriber terminals 4. The subscriber terminals may be scattered throughout the access point cell coverage area. The cell coverage area may further be split into sectors 3 and 5 wherein each sector is covered by a different frequency. Now consider one sector containing subscriber terminals 6, 8, and 10, each respectively further from the access point than the former. With reference to FIG. 2, it is apparent that each particular upstream time slot 20 must have allotted an amount of time corresponding to the sum of a guard time 21 and a burst time 23. The first time slot 20 follows immediately from the downstream burst 25, allowing for RF turnaround time 27. As the access point does not know how far away the terminal which has been allotted that particular transmission slot is, the guard time must be provided to allow for the maximum signal propagation delay across the cell. For example, if time slot 20 has been allotted to terminal 6, then the burst 14 from terminal 6 begins to arrive only a little after the start of the guard time as shown by arrow 302. However, if the time slot 20 is allotted to terminal 10, then the signal propagation delay from terminal to the access point causes the upstream burst 18 from terminal 10 to begin to arrive at the end of the guard time as shown by arrow 304. Where the subsequent time slot is then allotted to a different terminal (e.g. terminal 6), there is the possibility that signals from the first time slot (i.e. from terminal 10) and the subsequent time slot (i.e. from terminal 6) could arrive at the access point concurrently, thus corrupting each signal. In order to avoid this, guard times (22) must be provided for each time slot. This clearly reduces overall transmission efficiency, as a significant portion of each upstream time slot must be vacant.

SUMMARY OF THE INVENTION

The present invention overcomes this problem by providing a method and system which compensates for the differences in signal propagation delay by causing each subscriber terminal to artificially simulate being at the same distance from the access point as every other subscriber terminal. This eliminates the need for guard times between each subsequent slot, as the propagation delays are simply forced to be the same for every subsequent transmission and hence there is no possibility of bursts transmitted in different time slots arriving at the access point at the same time. Only one guard time is required at the start of the very first upstream time slot to allow for the very first propagation delay. Subsequent time slots then do not require guard times as the delay is always the same. The removal of the requirement for guard times means that channel efficiency is improved.

According to the present invention, there is provided a method of compensating for signal propagation delay in a data communications network comprising a central control node and one or more remote subscriber nodes, comprising the steps of:

a) measuring the respective signal propagation delays for each subscriber node; and b) using the respective signal propagation delays in each remote subscriber terminal to artificially simulate that each remote subscriber terminal is at the same distance from the central control node as every other remote subscriber terminal.

Each remote subscriber terminal may artificially simulate being at a maximum allowable distance corresponding to the maximum signal propagation delay from the central control node.

The data traffic on the network can be regulated per unit time frame by the central control node. In this case, the measuring step a) further comprises the steps of: designating a registration time slot per time frame in which the remote subscriber nodes may each first transmit a first transmission; transmitting said first transmission from the remote subscriber nodes at the start of the registration time slot; measuring one or more respective time period from the start of the registration time slot to the receipt at the central control node of each first transmission from each remote subscriber node, each time period corresponding to a respective propagation delay for transmission of signals from one of the remote subscriber nodes to the central control node; and indicating to each respective remote subscriber node the respective measured time period for that node; wherein each remote subscriber node then uses its respective measured time period to compensate for signal propagation delay when transmitting subsequent data traffic to the central control node.

The designating step may further comprise the steps of: defining said registration time slot for a present time frame at said central control node; and transmitting a control data portion to each remote subscriber node from the central control node, said control data portion including an indication of when said registration time slot for the present time frame is to occur.

The measuring step may further comprise the steps of: setting a value in a countdown timer, said value corresponding to a minimum signal propagation delay; starting said countdown timer to count down from said value at the start of the registration time slot; and reading the value from said timer at the moment when each respective first transmission from the respective remote subscriber node is received at the central control node; wherein said read values are then directly indicated to the respective remote subscriber nodes as said time periods.

The remote subscriber terminals may use the read values to compensate for delay by delaying any subsequent transmission of data traffic by an amount of time corresponding to the read value.

The method of the present invention may be used in combination with a method of open-loop power control of the transmit power of the remote subscriber terminals, as described later.

The method of the present invention may also be used in combination with a method of baseband delay compensation, as described later.

According to another aspect of the present invention, there is provided a system for compensating for signal propagation delay in a data communications network comprising a central control node and one or more remote subscriber nodes, said system comprising:
   a) measuring means for measuring the respective signal propagation delays of each subscriber node; and
   b) means for using the respective signal propagation delays in each remote subscriber terminal to artificially simulate that each remote subscriber terminal is the same distance from the central control node as every other subscriber terminal.

In the system, data traffic on the network may be regulated per unit time frame by the central control node, and the measuring means may comprise: control means for designating a registration time slot per time frame in which the remote subscriber nodes may each further transmit a first transmission; transmission means for transmitting said first transmission from each of the remote subscriber nodes at the start of the registration time slot; counter means for measuring one or more respective time periods from the start of the registration time slot to the receipt at the central control node of each first transmission from each remote subscriber node, each time period corresponding to a respective propagation delay for transmission of signals from one of the remote subscriber nodes to the central control node; and means for indicating to each remote subscriber node the respective measured time period for that node; wherein each remote subscriber node further includes means for using its respective measured time period to compensate for signal propagation delay when transmitting subsequent data to the central control node.

The control means may further comprise: means at each central control node for defining said registration time slot for a present time frame; and means for transmitting a control data portion to each remote subscriber node from the central control node, said control data portion including an indication of when said registration time slot for the present time frame is to occur.

The counter means may further comprise: means for setting a value in a countdown timer corresponding to a minimum signal propagation delay; means for starting said countdown timer to count down from said value at the start of the registration time slot; and means for reading the value from said timer at the moment when each respective first transmission from each respective remote subscriber node is received at the central control node; wherein said read values are then directly indicated to each respective remote subscriber nodes as said time periods.

Each subscriber terminal may use its respective read value to compensate for signal propagation delay by delaying any subsequent transmission of data traffic by an amount corresponding to the respective read value.

The system of the present invention may be used in combination with a system for open-loop power control of the transmit power of the remote subscriber terminals, as described later.

The system of the present invention may also be used in combination with a system for baseband delay compensation, as described later.

It is an advantage of the present invention that time delay compensation is achieved without using any additional network bandwidth. The control loop is also open, and as such has no unwanted dynamics or transients.

It is a further advantage of the present invention that the time delay compensation of the present invention maximizes the network's bandwidth efficiency, since the guard times between upstream bursts can be eliminated.

BRIEF DESCRIPTION OF THE DRAWINGS

Further features and advantages of the present invention will become readily apparent from the following detailed description thereof, in which:

FIG. 5 illustrates the structure of another signal sub-frame used to communicate a compensation value used in the present invention;

FIG. 6 demonstrates the operation of the signal propagation delay method and system;

DESCRIPTION OF THE PREFERRED EMBODIMENT

Figure 1:
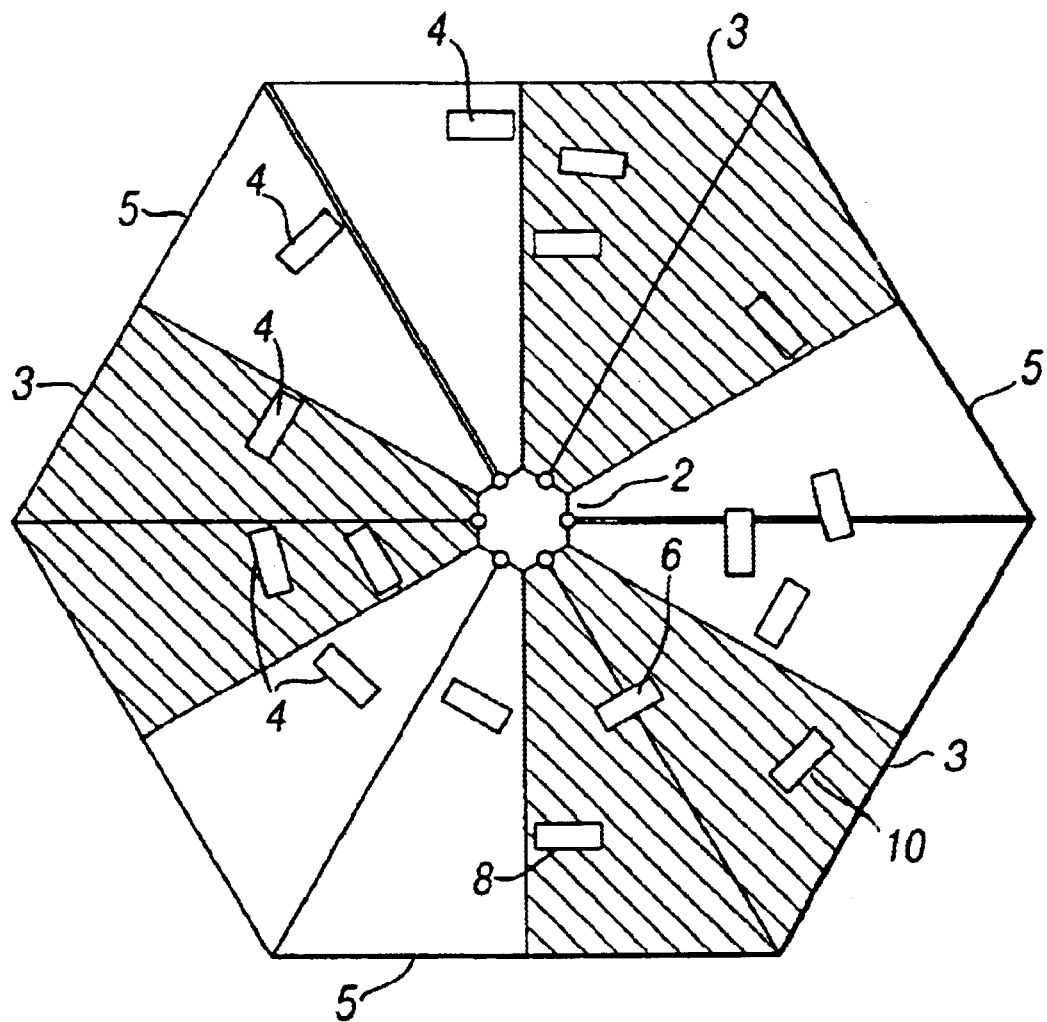
FIG. 1 shows a typical network deployment in which the method and system of the present invention may be used.
Figure 2:
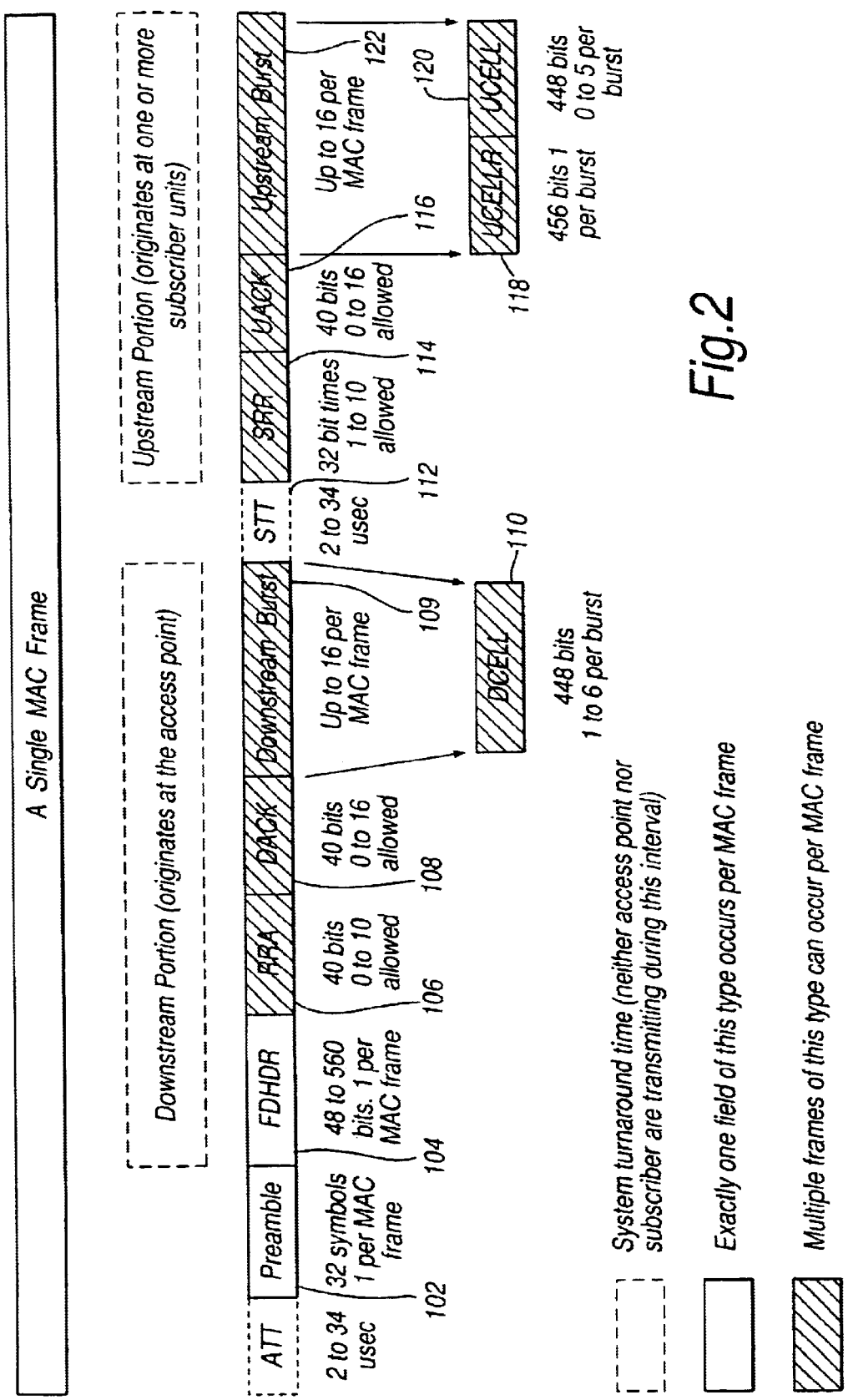
FIG. 2 demonstrates network operation without the propagation delay compensation of the present invention.

A specific embodiment of the present invention will now be described.

The method and system of the present invention are chiefly although not exclusively for use within a wireless access network deployed in a cellular configuration. Within the present particularly preferred embodiment, each cell consists of a central access point and multiple subscriber units. Subscriber units communicate to the network only through the access points, making the network a point-multi point architecture. The access point is the centre of all wireless network communication for the particular cell, and thus is the locus of control of access to the wireless medium for the cell.

Communication can occur on the wireless medium in both directions, and hence a means of duplexing the wireless medium is required. Two common methods are frequency division duplexing (FDD) and time division duplexing (TDD). In the case of FDD, the medium is broken into a downstream (data originating from the access point) frequency band and an upstream frequency band (data originating at the subscriber unit). TDD breaks a single frequency band into downstream time slots and upstream time slots. The network to which the present invention is applied uses TDD.

For the purpose of understanding the present invention, it is useful to view the network to which the invention is applied as consisting of multiple switches. On one end, corresponding to the access point, there is a switch with a single physical wired data port, and multiple wireless data ports. Disbursed throughout the cell are two port switches, each located at a subscriber terminal. Each subscriber terminal has a single wireless port and a single physical wired port.

In order to initiate communications over the network, a subscriber terminal must first register with an access point. During the registration process, a subscriber terminal negotiates with an access point to be assigned a temporary port identifier, referred to as a subscriber unit access identification (SU_AID). Once a subscriber terminal has been granted an SU_AID, it is capable of proceeding with higher layer signalling to gain access to the network medium.

Following registration, access of the subscriber terminals to the wireless medium is controlled through central control of the subscriber terminals by the access point. In order to achieve this the access point is provided with a medium access controller (MAC) which administers the medium control. Similarly, each remote subscriber terminal is also provided with a compatible medium access controller for responding to the central MAC in a master-slave manner: the subscriber terminals request access to the medium and the access point has the ability to grant access or fail to grant access based on the current level of network utilisation. Access to the network is granted in the form of time slots—when a subscriber terminal is granted the ability to access the wireless network medium, it is granted one or more time slots in which it can transmit. Within the granted time slot the entire medium capacity is available to the subscriber node to transmit its payload data. By referring to a medium access controller, it is to be understood that either a hardware or software based control means is envisaged and that reference to a controller as such implicitly includes reference to those control means required at both the central access point and at the subscriber terminals. In this respect, the medium access controller (MAC) therefore corresponds to those network means, whether hardware or software based, that would approximate to the Network-level and/or the Data-level of the ISO Open Systems Interconnection 7-layer Reference Model. As an example, a suitable hardware implementation of the MAC can be achieved using a Field Programmable Gate Array (FPGA).

The MAC operates by controlling transmissions on the medium by the definition of a MAC frame, being the framework in which data transmissions take place. In order to filly understand the various features and advantages of the present invention as applied to this implementation, it is necessary to first describe the constituent parts of a MAC frame, followed by a description of the various data structures used in the MAC. This will be performed by reference to FIGS. 3 through 5.

Figure 3:
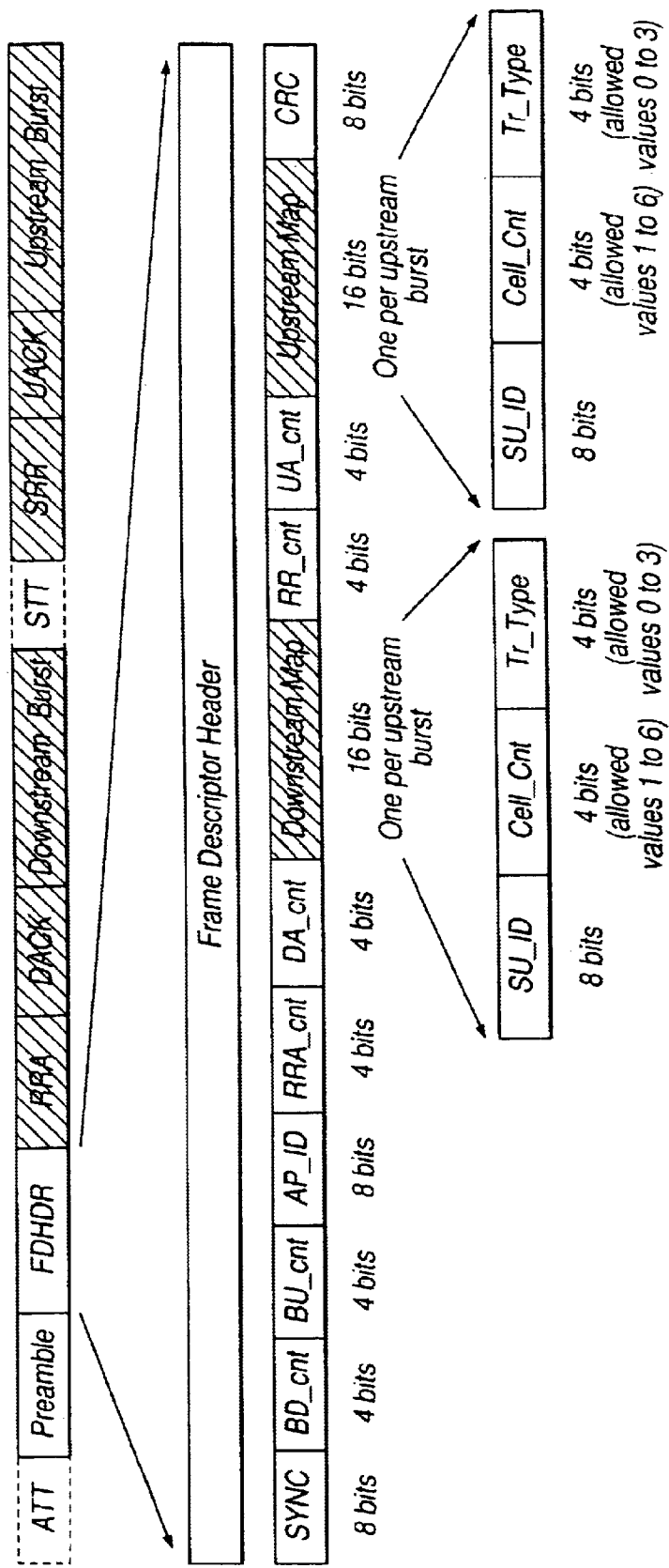
FIG. 3 shows a signal frame structure used in an implementation of the present invention.

FIG. 3 shows the overall structure of a single MAC frame. The MAC frame consists of a downstream portion, generated by the access point and broadcast to all subscriber terminals, and an upstream portion, which consists of a contention interval and all data bursts being sent from subscriber terminals back to the access point.

Figure 4:
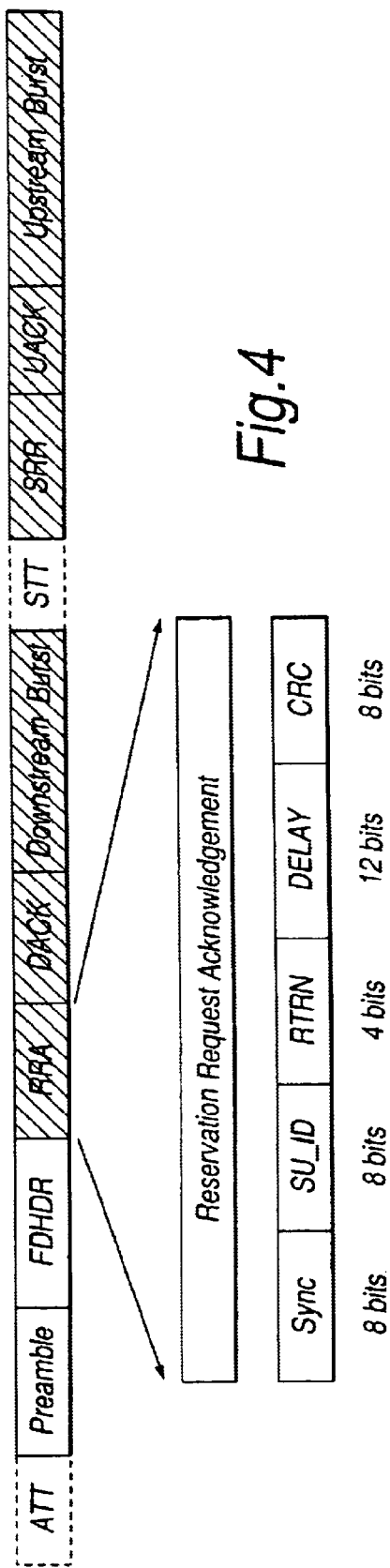
FIG. 4 shows the structure of a control data sub-frame used in the present invention.

The downstream portion consists first of a preamble (102). The preamble is a Physical layer synchronization sequence of fixed length, used for frame acquisition and channel estimation. Only one preamble may occur per MAC frame. Immediately following the preamble is the frame descriptor header (FDHDR) (104). The FDHDR describes the complete contents of the remainder of the MAC frame. The size of the FDHDR may vary. The FDHDR contains a map of all traffic, upstream and downstream, to occur within the MAC frame. After achieving bit synchronisation on the MAC frame via the preamble, subscriber terminals demodulate the FDHDR and from that gain complete knowledge of the traffic that will occur within the remainder of the frame. Only one FDHDR may occur per MAC frame. The precise contents of the FDHDR are shown in FIG. 4 and described in detail in Table 1 below.

TABLE 1

Frame Descriptor Header (FDHDR) Structure

| Field Tag | Description |
| --- | --- |
| SYNC | Short 4 symbol sync burst. |
| BD_cnt | Bursts Downstream Count. Number of subscriber units having payload data sent to them in this MAC frame |
| BU_cnt | Bursts Upstream Count. Number of subscriber units that will be sending payload data in this MAC frame. |
| AP_ID | Access Point ID. Identifies the access point that originated the frame descriptor header. |
| RRA_cnt | Reservation Request Acknowledgment Count. Number of acknowledgments being sent in response previous requests. |
| DA_cnt | Downstream Acknowledgment Count. Number of upstream cell acknowledgements being sent downstream in this MAC frame. |
| Downstream Map | Identifies the subscriber unit being sent cells, the number of cells to be sent, and the traffic type being sent. |
| RR_cnt | Reservation Request count. Total number of reservation request slots that will be made available in this MAC frame. |
| UA_cnt | Upstream Acknowledgment count. Total number of downstream cell acknowledgments being sent upstream in this MAC frame. |

TABLE 1-continued

Frame Descriptor Header (FDHDR) Structure

| Field Tag | Description |
| --- | --- |
| Upstream Map | Identifies the subscriber units that have been granted reservations, the number of cells to be sent by each, and the traffic reservations, type allowed. |
| CRC | Cyclic Redundancy Check. Allows each subscriber terminal to verify correct receipt of the frame descriptor. |
| SU_ID | Subscriber Unit ID. Identifies the subscriber unit acting as the data source or sink in the burst. |
| Cell_Cnt | Cell Count. Total number of ATM cells to be sent in this particular burst. |
| Tr_type | Traffic Type. Defines the type of traffic that the subscriber unit is allowed to send or will be receiving during the current frame. |

Following the FDHDR is the reservation request acknowledgement (RRA) portion 106. The RRA acknowledges a request by a subscriber for upstream time slots and can also communicate signal propagation delay. There is a single RRA for each reservation request that was made during the contention interval from the previous MAC frame, although in the case where no reservation requests were made in the previous MAC frame, then no acknowledgements will be sent. The precise contents of the RRA are shown in FIG. 5 and described in detail in Table 2 below.

TABLE 2

Reservation Request Acknowledgement (RRA) Structure

| Field Tag | Description |
| --- | --- |
| Sync | 8 bit framing synchronization sequence |
| SU_ID | ID of the subscriber unit that originated the reservation request, and to which the reservation request acknowledgment is directed. |
| RTRN | Return Code. Communicates reservation status to SUs and SU_AID status to SUs performing registration. |
| DELAY | Delay compensation bits. These bits are assigned during subscriber unit registration and cause a shift in subscriber unit timing. |
| CRC | Cyclic Redundancy Code. Used by the subscriber unit to verify that the frame has been received error free. |

The DELAY field is particularly pertinent to the present invention, as will be described later.

Following the RRA comes the Downstream Acknowledgement (DACK) portion 108 containing DACK cells. Each DACK cell contains a downstream ack or nack of a single upstream burst from a previous MAC frame. There is a single DACK cell for each upstream burst from the previous MAC frame, although in the event that there were no previous upstream bursts then no DACKs will be sent.

Following the DACK portion comes the Downstream Burst (109). The MAC operates on a principle of cell bursts for communicating payload data between the access point and the subscriber terminals by allowing multiple cells of data to be sent to or from a particular subscriber unit at a time. A burst must always consist of at least one cell. In upstream bursts, this single cell must be an upstream cell with reservation request (UCELLR) (118). Additional cells in the upstream burst are in the format of a UCELL—an upstream cell without reservation request (120). Upstream cells are discussed in more detail later. Downstream bursts can also consist of multiple cells, but there is only one type—the downstream cell (DCELL) 110. There can be many DCELLs—either several directed to a single subscriber terminal, or several directed to several subscriber terminals. Each DCELL contains one ATM cell of payload data. Currently the MAC allows bursts to have a maximum size of six cells, although more or less cells may be designated per burst if required in a future implementation without departing from the scope of the present invention. The downstream burst concludes the downstream portion transmitted by the access point and received at all subscriber terminals. There then follows a slight delay due to subscriber turnaround time (STT) 112. The STT varies with distance to the farthest subscriber unit. A typical maximum distance to a subscriber unit could be, for example, 5 km, although this obviously depends on the network configuration and the size of each network cell. Minimisation of the STT will be discussed later.

Following the STT comes the Upstream Portion of the MAC frame, being data transmitted from the subscriber units to the access point. The entire expected structure of the upstream portion has already been communicated to each and every subscriber terminal in the FDHDR transmitted in the downstream portion. Therefore, each subscriber terminal knows whether or not it is permitted to transmit in the upstream portion, what data it is to transmit, and when it is to transmit this data. In this way absolute control of the contents of the upstream portion can be controlled by the access point. With such a mechanism, however, it becomes necessary to define a period in which subscriber terminals can first communicate a request for transmission permission to the access point, without which no subsequent permission would ever be granted. This period forms the first part of the upstream portion, being the subscriber reservation request (SRR) portion 114.

The SRR is basically a contention based reservation request interval. If a subscriber terminal has been sitting idle with empty data queues, the arrival of a burst of data on its physical port will force it to request a time slot reservation from the access point. Because the subscriber terminal has no active reservations, and because it is believed that at any given time the number of terminals making initial bandwidth requests will be small, it is reasonable to force the subscriber terminals to contend for reservations. This contention window is kept as small as possible while still allowing reasonable success probability by employing a novel implementation of aloha contention control schemes. Once the subscriber terminal's reservation request has been acknowledged by the access point, the subscriber terminal ceases requesting bandwidth in the contention slots, allowing other terminals access to the contention interval. The number of SRR's that may occur in one MAC frame is communicated to the subscriber terminals in the FDHDR. Multiple slots can be made available during times of heavy request traffic. Furthermore, the start of the contention interval can be calculated by the subscriber terminals by virtue of the FDHDR indicating to each terminal the number of RRAs, DACKs and the structure of the downstream burst in the subsequent downstream portion of the MAC frame. The contention interval then begins immediately after the end of the downstream burst, allowing for the STT.

Following the contention interval comes the upstream acknowledgement portion 116, containing upstream acknowledgement (UACK) cells of each downstream burst received during the downstream portion. Each UACK indicates upstream ack or nack of a single downstream burst from a previous MAC frame. As many UACKs may be transmitted in each upstream acknowledgement portion as there were downstream bursts in the downstream portion.

Following the upstream acknowledgement portion comes the upstream burst portion 122, containing cell bursts from subscriber units which were granted permission in the FDHDR to transmit payload data to the access point. The FDHDR from the downstream portion contains the instructions to the subscriber terminals on when to transmit a burst in the upstream burst portion, and what the burst is expected to contain. Each upstream burst contains one or more data cells with the same traffic type being sent from a particular subscriber terminal. Each upstream burst made in the upstream burst portion may be from a different subscriber unit, or alternatively may be from the same subscriber unit, depending upon the channel allocations granted to the subscriber units. In this way channel allocations can be dynamically arranged between the subscriber terminals from MAC frame to MAC frame, depending on the network traffic loading and the traffic priority. As mentioned earlier, each upstream burst must contain a single upstream cell with reservation request (UCELLR) 118, and zero or more upstream cells without reservation request (UCELL) 120. The condition that a burst must contain a UCELLR allows a subscriber terminal to maintain its channel reservation until all of its payload data has been sent, thus meaning that the subscriber terminal need not transmit again during the contention interval to request channel allocation to transmit the remainder of its data. This combination of the reservation maintenance request and the upstream cell into one message allows a single downstream acknowledgement to serve as both reservation request acknowledgement and payload cell acknowledgement, thus improving bandwidth efficiency.

Having described the full contents of the MAC frame, the particular implementation of the present invention will now be described.

Figure 7:
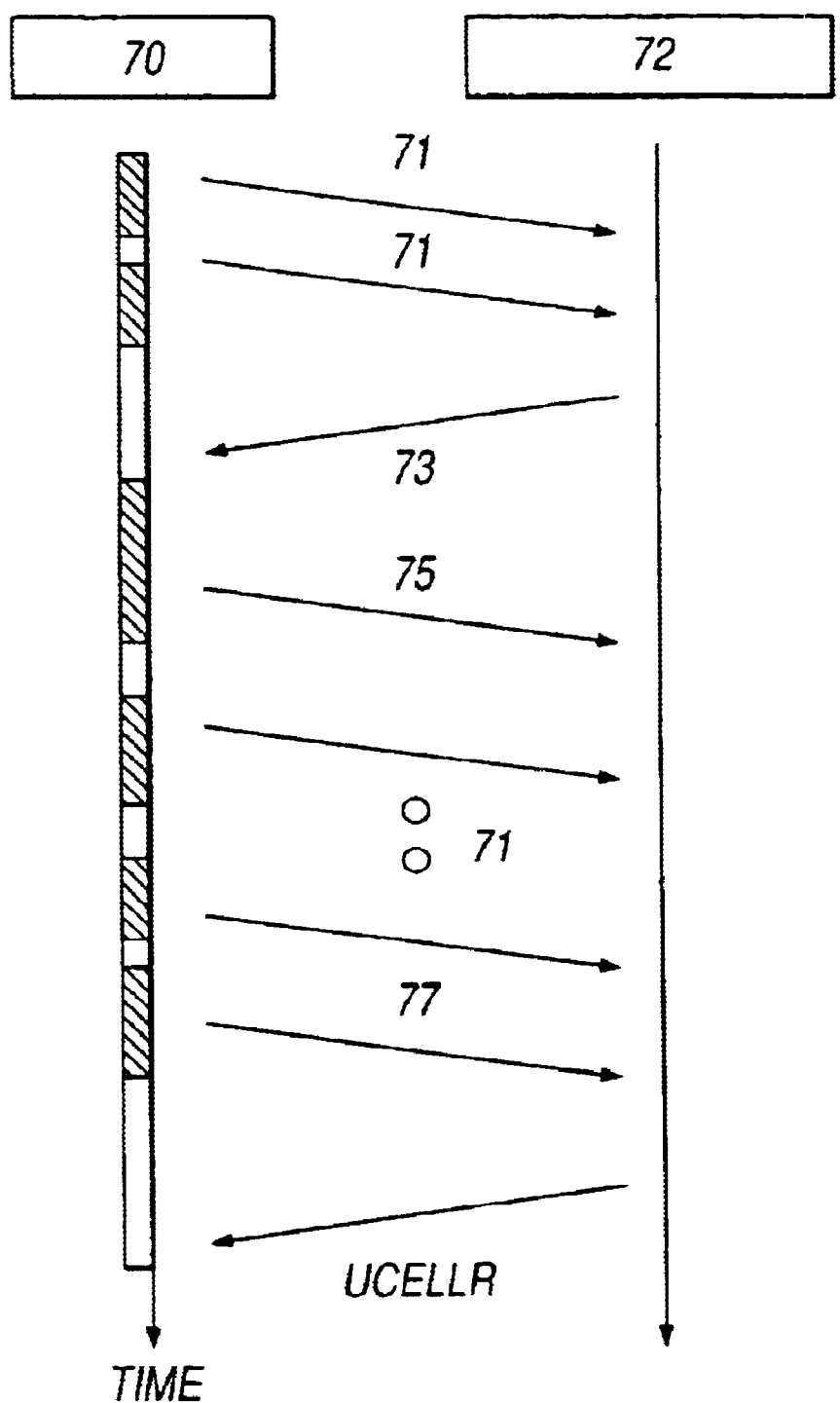
FIG. 7 illustrates the sequence of messages used in the method and system of the present invention.

FIG. 7 illustrates the sequence of messages passed between the access point (70) and a particular subscriber terminal (72) during network terminal registration, which is the period in which power control and delay compensation are performed. At the front of the downstream portion of the MAC frame is a frame synchronization burst. The access point transmits the downstream portion (71) of the MAC frame periodically, even when there is no traffic to be sent within the network. When the network terminal is first powered on, it searches for this burst. The subscriber terminal uses the preamble of the downstream burst to synchronise with the burst, and then receives and de-modulates the FDHDR to locate the upstream contention interval. The terminal then transmits back a bandwidth reservation request (73) within the contention window of the upstream portion of the current frame.

This first reservation request 73 transmitted by the subscriber terminal may be compensated in power level but uncompensated in time delay. The procedure for power level compensation is described later. The access point MAC starts a countdown timer at the beginning of the contention interval, whose purpose is to measure the amount of compensation needed by any subscriber terminal that may transmit within the contention interval. When the subscriber terminal's transmission 73 arrives, the compensation value is taken directly from the countdown timer and placed in the DELAY field of the reservation request acknowledgement 75 sent back to the terminal.

The terminal receives the RRA and reads the DELAY value from the delay field. The terminal then continues to monitor the downstream bursts. Some time later, the access point sends the terminal a reservation grant by including the terminals' SU_AID in the upstream burst map of the FDHDR. The terminal therefore now knows that it is permitted to transmit in the upstream burst of the particular MAC frame. However, when doing so the subscriber terminal now uses the value previously communicated to it in the DELAY field to hold off its transmission by that measured value, so that the burst arrives at the access point aligned in time with other upstream bursts. FIG. 6 illustrates how the various delays applied between the subscriber terminals achieve time alignment.

With reference to FIG. 6, it will be seen that following a downstream burst 25 and RF turnaround time 27, a first time slot 20 is defined which consists of a single guard time 21 and a upstream burst slot 23. A second upstream burst slot 24 then immediately follows the slot 23, with no guard time in between. In order for respective upstream bursts 12 and 18 from subscriber terminals 6 and 10 (c.f FIG. 1) to arrive at the access point in consecutive time alignment with the allotted upstream burst slots, each subscriber terminal must apply a single delay to its transmission corresponding to its respective measured delay value. An example with reference to FIG. 6 will make this clearer.

In FIG. 6, assume that the terminal 6 has been allocated the first upstream burst slot 23, and terminal 10 has been allocated the second upstream burst slot 24. As terminal 6 is relatively close to the access point, the propagation delay from the terminal to the access point is small and hence a large delay 62 is applied before transmission to cause the upstream burst 12 to arrive at the access point at the end of the guard time 21 and hence in time-alignment with the first burst slot 23. If the first burst slot 23 had been assigned to terminal 8, then a smaller delay 4 would have been applied before transmission, as the terminal 8 is further from the access point than terminal 6. If the first burst slot 23 had been assigned to the terminal 10 located near the cell edge 29, then no delay would be applied, as the propagation delay from terminal 10 to the AP is equal to the guard time 21.

Now consider the upstream burst 18 from terminal 10, which has been allocated the second upstream burst slot 24. Terminal 10 must transmit the burst 18 at an appropriate time to arrive at the AP precisely after the upstream burst 12 has arrived from terminal 6. Now, recalling that each terminal in the network has full knowledge of all the upstream cell bursts to be transmitted from every other terminal in the cell during the present MAC frame, terminal 10 will know the duration of the preceding burst slot 23 for terminal 6, and hence will be able to transmit its own upstream burst 18 at the appropriate time to arrive at the AP at the start of the slot 24. As terminal 10 is on the cell edge, it does not apply any delay prior to measuring the preceding slot 23 and transmitting its own burst 18 to arrive in time-alignment with slot 24. If, for example, terminal 8 had been allocated slot 24, then the delay 64 would have been applied before starting to measure the preceding slot 23 and the subsequent transmission of its own burst 14. Similarly, terminal 6 would apply the delay 62 in the same manner. In this way precise time alignment can be achieved from burst to burst, whilst allowing for the differences in signal propagation delay between each terminal and the access point.

It will thus be apparent that only one delay need be applied per MAC frame for each subsequent upstream burst in the upstream portion of the present MAC frame to arrive at the AP in time-alignment with their respective allocated slots. The respective delays for each terminal must always be applied at the very start of each overall upstream burst portion 122 (c.f. FIG. 3) in each MAC frame.

The delay compensation scheme of the present invention as implemented herein presents very little network overheads. Since the network terminal must pass the bandwidth request to the network terminal anyway, the delay compensation scheme is implemented using very little additional bandwidth. The only additional bandwidth required is the DELAY field of the reservation request acknowledgement downstream burst.

An open-loop transmission power control method and system will now be described, which can be used in combination with the above described method and system for propagation delay compensation.

Strictly speaking, a wireless network does not require a power control mechanism in order to function. The access point receiver could use Automatic Gain Control (AGC) and a wide dynamic range receiver to receive each burst. However, this would require a long period of energy at the front of each upstream burst, used strictly for AGC loop stabilization. An alternative power control scheme could use the access point receiver to measure the received signal strength from each subscriber terminal, then send a power control message to each network terminal to increase or decrease its power. However, this scheme suffers from closed loop dynamics, plus reduces network bandwidth efficiency slightly. It also suffers from startup power control loop transients, since the first time the subscriber terminal transmits, it has not yet received any power control information.

The method and system of open loop power control to be described herein works on the following principle. The power level of the downstream burst arriving from the access point is measured and used to set the upstream transmit power of the network subscriber terminal, before the subscriber terminal has ever first transmitted. The advantage of this scheme is that, because it is not closed loop, the control scheme is instantly stable. Furthermore, because the subscriber terminal measures the received power on each downstream burst, it is capable of tracking rapid changes in signal propagation. Moreover, because the subscriber terminal measures the received signal power of a downstream burst before ever transmitting, there are no initial transients in the power control scheme. The first time the subscriber terminal transmits, it does so at the proper power level.

In addition to the above, the access point's tolerance of adjacent channel interferers is improved, since A/D dynamic range in the receiver is not spent on accommodating wide variations in received signal power. Furthermore, since the network terminal dynamically tracks the signal propagation conditions, transmit power of the network terminal can be reduced to the minimum necessary for acceptable error rates at the access point. This enables efficient power usage at the network terminals, which enables battery powered terminals. Finally, power estimation is done quickly enough to track dynamic fading channel conditions.

As stated before, the sync burst of the MAC frame is used for open loop power control. The network terminal measures the total energy of the downstream burst, then uses it as an index into a lookup table of transmit power attenuator settings. By doing so, the network terminal is able to make the received signal strength of the upstream bursts, as seen by the access point, match to within 3 dB. When the subscriber terminal is not actively transmitting, it is searching the channel for the downstream synchronization burst of the MAC frame. Therefore the subscriber terminal is constantly monitoring the channel and thus is always able to transmit at the proper power level, even in dynamic channels. Because this scheme uses a simple lookup table, it is easy to implement in a high speed network.

A method and system for compensating for baseband delay in any of the network nodes will now be described. This method and system may be used in combination with either or both of the above described methods and systems.

Channel utilisation can be improved by reducing the turnaround time between receipt of a signal at a network terminal and subsequent transmission of a second signal from the terminal. The turnaround time is dominated by the propagation time of baseband signals through the transmit path of the network terminal's modem. By using a bi-directional signal path within the modem then turnaround time can be minimised.

Figure 8:
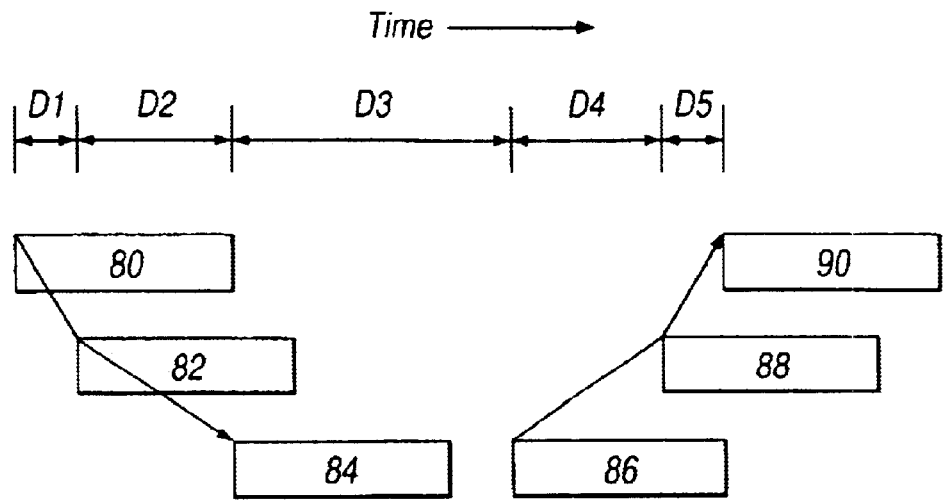
FIG. 8 shows network terminal operation without baseband delay compensation.

FIG. 8 shows the time sequence of bursts in a network terminal that doesn't use baseband delay compensation. Here the downstream burst (80) is received at the antenna and takes some time propagating through the RF hardware before arriving at the modem. This is the source of delay D1. Then the signal is processed by the modem (82), which is the source of delay D2. When the symbols appear at the MAC (84), it processes them and assembles an upstream burst (86). This MAC processing time is the source of delay D3. Once the symbols comprising the upstream burst have been assembled, they are passed through the transmit path of the modem (88), which is the source of delay D4. Finally, there is propagation time through the transmit RF path (90), which is the source of delay D5.

The method of baseband delay compensation to be described herein is as follows.

As mentioned earlier, the downstream portion of the MAC frame includes the frame descriptor header, which describes completely the contents of the entire MAC frame. Each network terminal that demodulates the frame map knows where and when in the upstream burst it must transmit its burst. As such, it is possible for each network terminal to prepare its upstream bursts in advance of the time at which they are to go over the air.

Signal propagation time through the transmit portion of the modem is dominated by delay through the FIR pulse shaping filter. By using a separate transmit and receive path through the network terminal modem and sending the transmit symbols through the modem early, it is possible to have filtered baseband signal present at the RF modulator input precisely at the time the transmitter has stabilized.

Figure 9:
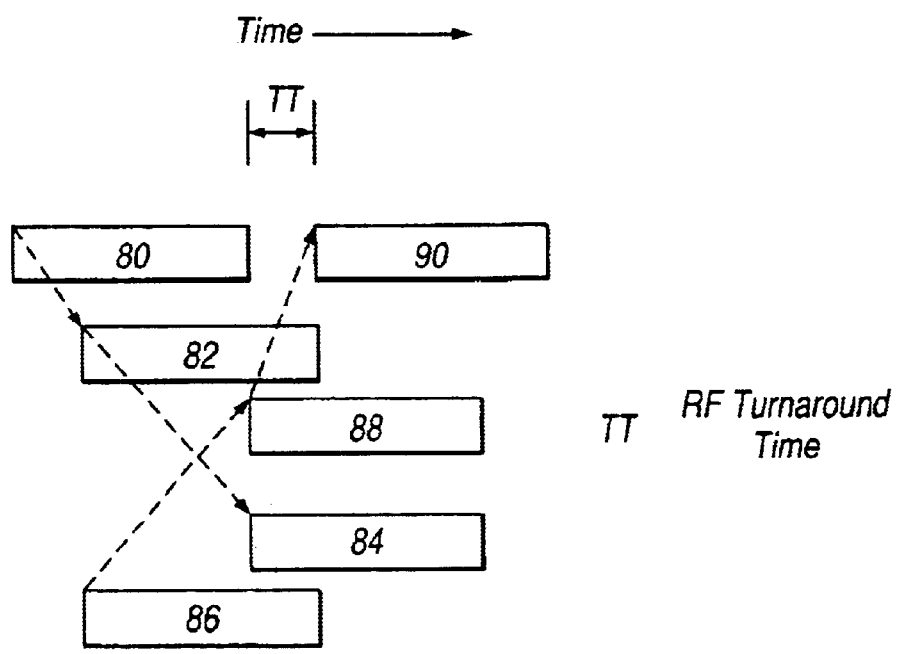
FIG. 9 illustrates network terminal operation with baseband delay compensation.

FIG. 9 demonstrates the operation of a network terminal using such compensation. The same reference numerals as in FIG. 8 are used to demonstrate the order and timing in which the identical operations of FIG. 8 are performed using the present method of baseband compensation. With reference to FIG. 9, the upstream burst is assembled (86) before the complete downstream burst has arrived at the MAC (84). This is possible because the network terminal has received a frame descriptor header, which has informed the network terminal far in advance exactly what to transmit and when. The network terminal starts the upstream burst through the transmit processing chain far enough in advance so that it passes through the RF portion (90) of the terminal just at the time the RF portion has stabilized in switching from receive to transmit operation. This allows the network terminal to operate with the minimum turnaround delay time of TT, equal to the receive-to-transmit switching time of the RF portion.

The method and system of the present invention may be integrally combined with either or both of the above described methods of baseband delay compensation and open-loop transmit power control.

The detailed description of the particularly preferred embodiment of the present invention presented above has referred to various of the data cells, and in particular various of the data payload cells as being ATM cells. It Is to be understood that the data cells need not be ATM cells exclusively, but may instead be data cells of a different structure which still satisfy and support ATM quality of service requirements. In this case, such data cells of a different structure are ATM compatible data cells.

What is claimed is:

1. A method of compensating for signal propagation delay in a data communications network comprising a central control node and one or more remote subscriber nodes, the method comprising the steps of:
    a) designating a registration time slot per frame in which the remote subscriber nodes may each first transmit a first transmission;
    b) transmitting said first transmission from the remote subscriber nodes at the start of the registration time slot;
    c) measuring one or more respective time periods from the start of the registration time slot to the receipt at the central control node of each first transmission from each remote subscriber node, each time period corresponding to a respective propagation delay for transmission of signal from one of the remote subscriber nodes to the central control node, by
        setting a value in a countdown timer, said value corresponding to a minimum signal propagation delay,
        starting said countdown timer to count down from said value at the star of the registration time slot, and
        reading the value from said timer at the moment when each respective first transmission from the respective remote subscriber node is received at the central control node, wherein said read values are then directly indicated to the respective remote subscriber nodes as said time periods;
    d) indicating to each respective remote subscriber node the respective measured time period for that node, wherein each remote subscriber node then uses its respective measured time period to compensate for signal propagation delay when transmitting subsequent data traffic to the central control node; and
    e) using the respective signal propagation delays in each remote subscriber terminal to artificially simulate that each remote subscriber terminal is at the same distance from the central control node as every other remote subscriber terminal.

2. A method according to claim 1, wherein said remote subscriber terminals use said read values to compensate for signal propagation delay by delaying any subsequent transmission of data traffic by an amount of time corresponding to said read value.

3. A method according to claim 1, wherein said data traffic on said network is passed over a common wireless channel.

4. A method according to claim 1, wherein said data traffic contains ATM compatible cells.

5. A method according to claim 1, in combination with a method of open-loop power control of the transmit power of the remote subscriber nodes.

6. A method according to claim 1, in combination with a method of baseband delay compensation.

7. A system for compensating for signal propagation delay in a data communications network comprising a central control node and one or more remote subscriber nodes, said system comprising:
    a) means for designating a registration time slot per frame in which the remote subscriber nodes may each first transmit a first transmission;
    b) means for transmitting said first transmission from the remote subscriber nodes at the start of the registration time slot;
    c) means for measuring one or more respective time periods from the start of the registration time slot to the receipt at the central control node of each first transmission from each remote subscriber node, each time period corresponding to a respective propagation delay for transmission of signal from one of the remote subscriber nodes to the central control node, comprising
        means for setting a value in a countdown timer corresponding to a minimum signal propagation delay,
        means for starting said countdown timer to count down from said value at the start of registration time slot, and
        means for reading the value from said timer at the moment when each respective first transmission from each respective remote subscriber node is received at the central control node, wherein said read values are then directly indicated to each respective remote subscriber nodes as said time periods; and
    d) means for indicating to each respective remote subscriber node the respective measured time period for that node, wherein each remote subscriber node then uses its respective measured time period to compensate for signal propagation delay when transmitting subsequent data traffic to the central control node; and
    e) means for using the respective signal propagation delays in each remote subscriber terminal to artificially simulate that each remote subscriber terminal is at the same distance from the central control node as every other subscriber terminal.

8. A system according to claim 7, wherein said remote subscriber terminals use said read values to compensate for signal propagation delay by delaying any subsequent transmission of data traffic by an amount of time corresponding to said read value.

9. A system according to claim 7, wherein said data traffic on said network which is passed over a common wireless channel.

10. A system according to claim 7, wherein said data traffic contains ATM compatible cells.

11. A system according to claim 7, in combination with a system for open-loop power control of the transmit power of the remote subscriber nodes.

12. A system according to claim 7, in combination with a system for baseband delay compensation.

13. A method of compensating for signal propagation delay in a data communications network comprising a central control node and one or more remote subscriber nodes, comprising the steps of:
    a) measuring the respective signal propagation delays for each subscriber node by:
        setting a value in a countdown timer, said value corresponding to a minimum signal propagation delay,
        starting said countdown timer to count down from said value at the start of the registration time slot, and
        reading the value from said timer at the moment when each respective first transmission from the respective remote subscriber node is received at the central control node, wherein said read values are then directly indicated to the respective remote subscriber nodes as said time periods; and
    b) using respective signal propagation delays in each remote subscriber terminal to artificially simulate that each remote subscriber terminal is at the same distance from the central control node as every other remote subscriber terminal.

14. A method according to claim 13, wherein said remote subscriber terminals use said read values to compensate for signal propagation delay by delaying any subsequent transmission of data traffic by an amount of time corresponding to said read value.

15. A system for compensating for signal propagation delay in a data communications network comprising a central control node and one or more remote subscriber nodes, said system comprising:

a) measuring means for measuring the respective signal propagation delays for each subscriber node comprising means for setting a value in a countdown timer, said value corresponding to a minimum signal propagation delay, means for starting said countdown timer to count down from said value at the start of the registration time slot, and means for reading the value from said timer at the moment when each respective first transmission from the respective remote subscriber node is received at the central control node, wherein said read values are then directly indicated to the respective remote subscriber nodes as said time periods; and b) means for using the respective signal propagation delays in each remote subscriber terminal to artificially simulate that each remote subscriber terminal is at the same distance from the central control node as every other subscriber terminal.

16. A system according to claim 15, wherein said remote subscriber terminals use said read values to compensate for signal propagation delay by delaying any subsequent transmission of data traffic by an amount of time corresponding to said read value.

* * * * *

UNITED STATES PATENT AND TRADEMARK OFFICE
CERTIFICATE OF CORRECTION

PATENT NO.    : 6,741,614 B1
DATED         : May 25, 2004
INVENTOR(S)   : John David Porter et al.

It is certified that error appears in the above-identified patent and that said Letters Patent is hereby corrected as shown below:

Column 13,
Line 28, "at the star" should read -- at the start --.

Column 14,
Line 41, after "said network", delete "which".

Signed and Sealed this

Twenty-eighth Day of September, 2004

JON W. DUDAS
*Director of the United States Patent and Trademark Office*